United States Patent
Skirko

(10) Patent No.: US 8,194,974 B1
(45) Date of Patent: *Jun. 5, 2012

(54) MERGE AND REMOVAL IN A PLANAR MAP OF AN IMAGE

(75) Inventor: Peter Skirko, Santa Clara, CA (US)

(73) Assignee: Adobe Systems Incorporated, San Jose, CA (US)

( * ) Notice: Subject to any disclaimer, the term of this patent is extended or adjusted under 35 U.S.C. 154(b) by 0 days.

This patent is subject to a terminal disclaimer.

(21) Appl. No.: 13/073,088

(22) Filed: Mar. 28, 2011

Related U.S. Application Data

(63) Continuation of application No. 12/416,058, filed on Mar. 31, 2009, now Pat. No. 7,925,084, which is a continuation of application No. 11/178,878, filed on Jul. 11, 2005, now Pat. No. 7,512,265.

(51) Int. Cl.
*G06K 9/00* (2006.01)

(52) U.S. Cl. ....................................... 382/162

(58) Field of Classification Search .......... 382/162–165, 382/173, 218–222, 254, 266, 271–275, 282, 382/284; 345/589, 592–593, 600–602, 619, 345/625, 629; 358/1.1, 1.9, 515–518, 537; 348/576, 577, 599, 624, 635, 655

See application file for complete search history.

(56) References Cited

U.S. PATENT DOCUMENTS

| | | |
|---|---|---|
| 4,958,272 A | 9/1990 | Wake |
| 5,260,695 A | 11/1993 | Gengler et al. |
| 5,621,648 A | 4/1997 | Crump |
| 5,649,173 A | 7/1997 | Lentz |
| 5,809,179 A | 9/1998 | Marimont et al. |
| 6,049,339 A | 4/2000 | Schiller et al. |
| 6,366,361 B1 | 4/2002 | Dermer et al. |
| 6,411,953 B1 | 6/2002 | Ganapathy et al. |
| 6,639,593 B1 | 10/2003 | Yhann |
| 6,697,538 B1 | 2/2004 | Angenent et al. |
| 6,870,545 B1 | 3/2005 | Smith et al. |
| 6,904,159 B2 | 6/2005 | Porikli |
| 7,035,461 B2 | 4/2006 | Luo et al. |
| 7,127,104 B2 | 10/2006 | Prasad et al. |
| 7,224,850 B2 | 5/2007 | Zhang et al. |
| 7,295,711 B1 | 11/2007 | Ahuja et al. |
| 7,385,612 B1 | 6/2008 | Peterson |
| 7,403,661 B2 | 7/2008 | Curry et al. |
| 7,512,265 B1 * | 3/2009 | Skirko .................. 382/162 |
| 7,515,745 B1 | 4/2009 | Skirko |

(Continued)

OTHER PUBLICATIONS

"U.S. Appl. No. 11/178,526, Non-Final Office Action mailed Jun. 11, 2008", 11 pgs.

(Continued)

*Primary Examiner* — Jose Couso
(74) *Attorney, Agent, or Firm* — Schwegman, Lundberg & Woessner, P.A.

(57) ABSTRACT

Methods and systems to merge and/or remove, for example, edges, regions, vertices, in a planar map of a raster image are disclosed. In one embodiment, a method includes identifying color similarities between each of a plurality of regions of an image and merging neighboring regions based on the color similarities. In addition, the method may include determining a merging order and merging certain regions based on the merging order; merging other regions without considering the merging order when the other regions are smaller than a threshold size; and removing artifacts and noise from the image based on the threshold size.

20 Claims, 18 Drawing Sheets

U.S. PATENT DOCUMENTS

| | | | |
|---|---|---|---|
| 7,590,268 | B1 | 9/2009 | Skirko |
| 7,630,541 | B2 | 12/2009 | Zitnick |
| 7,636,097 | B1 | 12/2009 | Holloway |
| 7,925,084 | B1 * | 4/2011 | Skirko .................. 382/162 |
| 7,929,755 | B1 | 4/2011 | Skirko |

OTHER PUBLICATIONS

"U.S. Appl. No. 11/178,526, Notice of Allowance mailed Nov. 19, 2008", 5 pgs.

"U.S. Appl. No. 11/178,526, Response filed Oct. 2, 2008 to Non-Final Office Action mailed May 11, 2008", 12 pgs.

"U.S. Appl. No. 11/178,878, Non-Final Office Action mailed Jun. 13, 2008", 9 pgs.

"U.S. Appl. No. 11/178,878, Notice of Allowance mailed Oct. 22, 2008", 5 pgs.

"U.S. Appl. No. 11/178,878, Response filed Sep. 15, 2008 to Non-Final Office Action mailed Jun. 13, 2008", 13 pgs.

"U.S. Appl. No. 11/178,878, Supplemental Notice of Allowability mailed Dec. 15, 2008", 3 pgs.

"U.S. Appl. No. 12/416,058, Non-Final Office Action mailed Aug. 20, 2010", 11 pgs.

"U.S. Appl. No. 12/416,058, Notice of Allowance mailed Dec. 14, 2010", 7 pgs.

"U.S. Appl. No. 12/416,058, Response filed Nov. 22, 2010 to Non-Final Office Action mailed Aug. 20, 2010", 13 pgs.

"U.S. Appl. No. 12/419,944, Non-Final Office Action mailed Aug. 19, 2010", 10 pgs.

"U.S. Appl. No. 12/419,944, Notice of Allowance mailed Dec. 9, 2010", 6 pgs.

"U.S. Appl. No. 12/419,944, Response filed Nov. 12, 2010 to Non-Final Office Action mailed Aug. 19, 2010", 12 pgs.

* cited by examiner

| EDGE NAME 252 | VERTICES 254 | | FACES 256 | | LEFT TRAVERSE 258 | | RIGHT TRAVERSE 260 | |
|---|---|---|---|---|---|---|---|---|
| | START | END | LEFT | RIGHT | PRED | SULL | PRED | SULL |
| a | X | Y | 1 | 2 | b | d | e | c |
| ⋮ | ⋮ | ⋮ | ⋮ | ⋮ | ⋮ | ⋮ | ⋮ | ⋮ |

PLANAR MAP TABLE 250

FIG. 2B

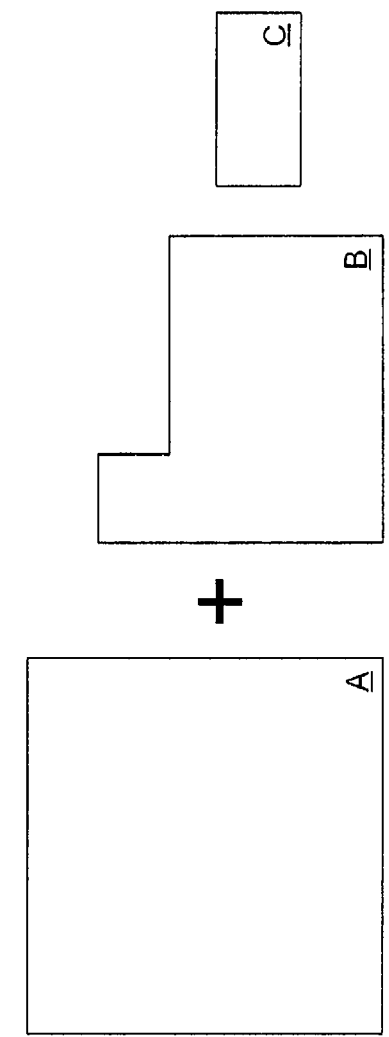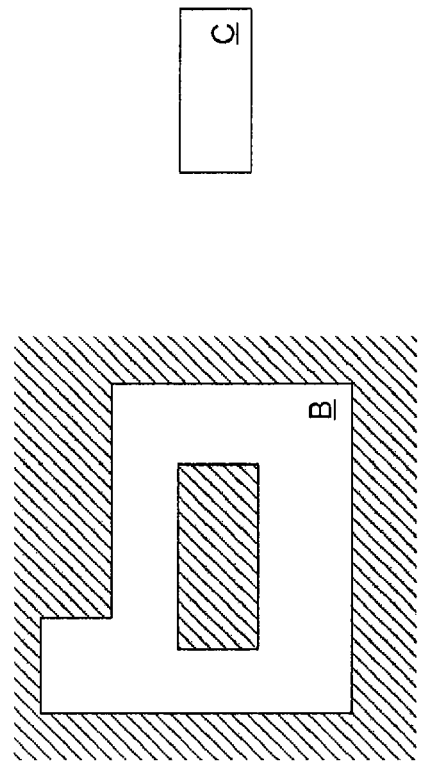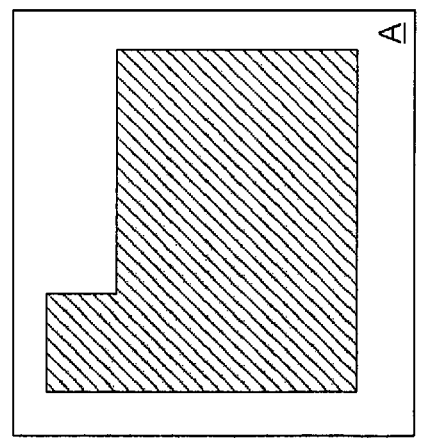
FIG. 7A
FIG. 7B
FIG. 7C

| Region Name | Color | Color of Most Similar Neighbor | Score |
|---|---|---|---|
| A | OXP155 | OM5166 | 1 |
| B | • | • | 2 |
| C | • | • | • |
| • | | | • |
| • | | | |
| • | | | |

SCORING MATRIX 1150

FIG. 11B

MERGE AND REMOVAL IN A PLANAR MAP OF AN IMAGE

RELATED APPLICATIONS

The present application is a continuation of application Ser. No. 12/416,058 filed on Mar. 31, 2009 ("MERGE AND REMOVAL IN A PLANAR MAP OF AN IMAGE"), now issued as U.S. Pat. No. 7,925,084, which is a continuation of application Ser. No. 11/178,878 filed on Jul. 11, 2005 ("MERGE AND REMOVAL IN A PLANAR MAP OF A RASTER IMAGE"), now issued as U.S. Pat. No. 7,512,265, which applications are hereby incorporated by reference in their entirety.

FIELD OF THE TECHNOLOGY

This disclosure relates generally to the technical fields of computer graphics processing, operator interface processing, and selective visual display systems and, in one example embodiment, to a method and a system to process digital data.

BACKGROUND

A drawing professional (e.g., a graphic artist) utilizes modern tools to help make his/her job easier. Particularly, the drawing professional often finds it convenient to "trace" a raster image (e.g., a JPEG file of a photograph, a GIF file of line art, etc.) using a computer system (e.g., a data processing system). Numerous techniques of computer tools such as Adobe® Streamline® and Adobe® Illustrator® have been developed to aid the drawing professional to trace the raster image.

One technique involves the application of mathematical curves (e.g., Bézier curves and/or Bézier splines using a Bézier curve tool). A Bezier curve may consist of two anchor points, through which the curve passes, and two control handles-one control handle for each anchor point. Moving the control handle adjusts the shape of the curve. A Bezier spline may be a concatenation of many Bezier curves together. Because each polygon (e.g., an abstract mathematical device to approximate ideal shapes) of the raster image must be manually traced using the Bézier curve tool, the process is inefficient, and results in "gapping", and/or spacing between polygons in a resulting data file (e.g., a traced output file).

Another technique is auto-tracing. Auto-tracing involves an algorithmic identification of various polygons in an image, and an automatic application of curves (e.g., Bézier curves) around each of the various polygons identified. Post processing may be performed to help reduce "gapping" between adjacent polygons. However, "gapping" between adjacent polygons still remains using auto-tracing. In addition, "beading" may arise in the resultant data file using auto-tracing techniques because regions of the raster image that are diagonally oriented (e.g., a checkerboard line pattern of the raster image) are treated as separate polygons. This results in visual distortion of the raster image in the resulting data file.

Numerous other techniques also exist to trace an image using computer tools. However, each of these techniques create "gapping" and/or beading. Numerous technical challenges exist to prevent gapping and/or beading in the resulting data file (e.g., boundary conditions are difficult to identify, cataloguing of various boundary parameters is slow, etc.).

As a result, the drawing professional may need to individually zoom in various segments of an image, and manually close gaps and undo beaded polygons within the resulting data file. This process is expensive and time consuming for the drawing professional and businesses involved in the digital arts profession must absorb this additional labor expense.

BRIEF DESCRIPTION OF THE DRAWINGS

Example embodiments of the present invention is illustrated by way of example and not limitation in the figures of the accompanying drawings, in which like references indicate similar elements and in which:

FIG. 2B is a table view of a planar map table used in connection with the raster image of FIG. 2A to generate a planar map, according to the one example embodiment.

FIGS. 7A-7C are image diagrams illustrating a topological methodology of tracing and a cut-out methodology of tracing, according to any example embodiment.

FIG. 11B is a table view of a scoring matrix used in conjunction with the merging process illustrated in FIG. 11A, according to an example embodiment.

Other features of the present embodiments will be apparent from the accompanying drawings and from the detailed description that follows.

DETAILED DESCRIPTION

A method and system to modify digital data are described. In the following description, for purposes of explanation, numerous specific details are set forth in order to provide a thorough understanding of the various embodiments. It will be evident, however, to one skilled in the art that the various embodiments may be practiced without these specific details. An example embodiment provides methods and systems to enable a user to trace digital data (e.g., digital image data, such as vector-based or non-vector based graphics and/or art embodied as a raster image). Example embodiments of a method and a system, as described below, may be used to trace, correct problems, process, and/or modify raster images utilizing a set of functions (e.g., tracing tools, curve tools, brushes, etc.) provided by a digital image adjustment application. It will be appreciated that the various embodiments discussed herein may/may not be the same embodiment, and may be grouped into various other embodiments not explicitly disclosed herein.

Figure 1:
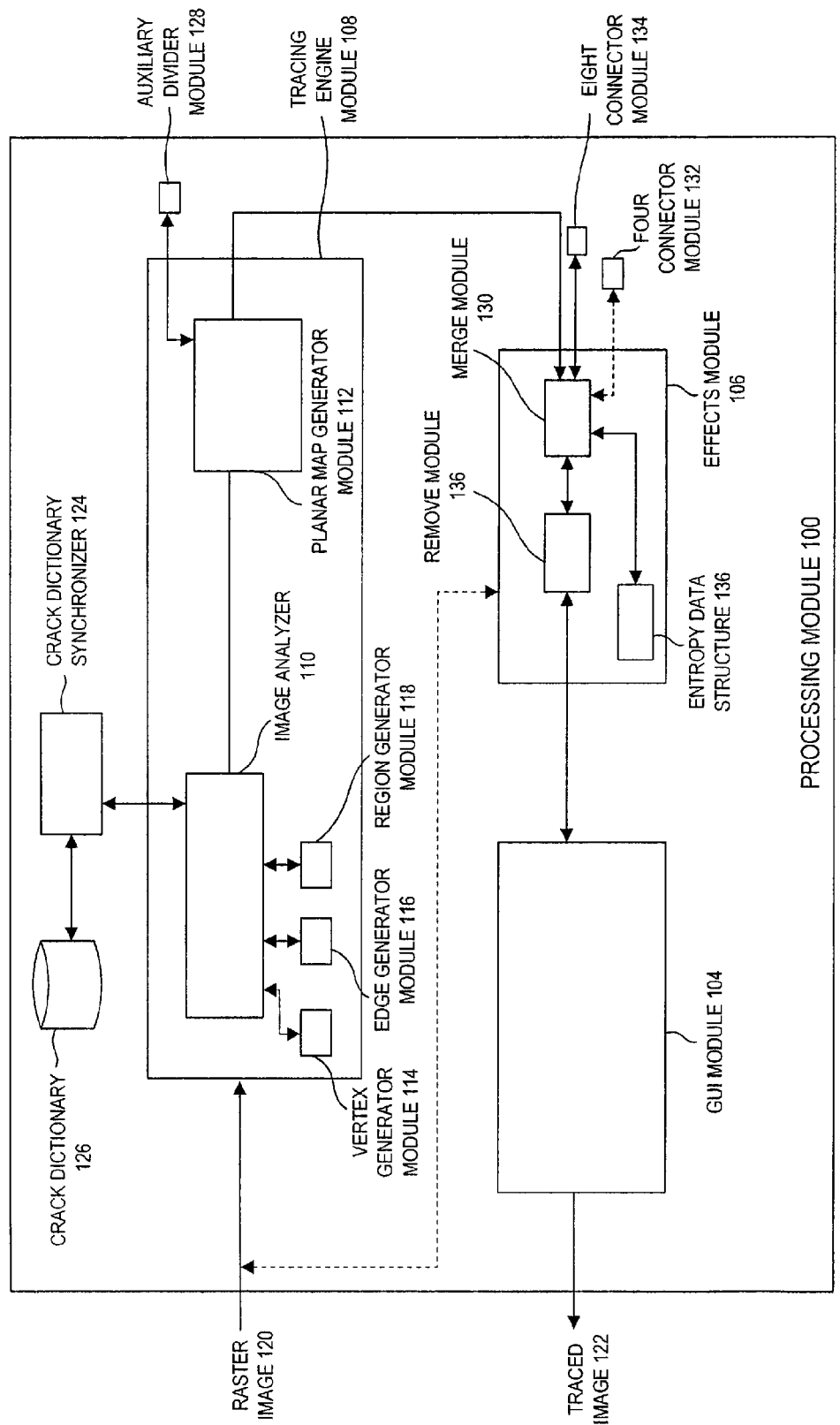
FIG. 1 is a block diagram of a processing module having a tracing engine module and an effects module, according to an example embodiment.

FIG. 1 is a block diagram of a processing module 100 having a tracing engine module 108 and an effects module 106, according to one embodiment. First, a raster image 120 (e.g., the raster image may be a type of digital image composed of individual pixels of various colors and saved in a file format such as GIF, JPEG, TIFF, BMP, PICT, and PCX) is received by the processing module 100 (e.g., may be received after a function call to an application program such as a drawing program like Adobe® Illustrator®) in an embodiment as illustrated in FIG. 1. Specifically, the raster image 120 is received into an image analyzer 110 in a tracing engine module 108 of the processing module 100 as illustrated in the embodiment of FIG. 1. In one embodiment, the raster image 120 is transmitted to an image complexity-reduction module (e.g., may be separate from and/or in the effects module 106 as illustrated by the dotted line in FIG. 1 between the raster image 120 and the effects module 106) to reduce the complexity (e.g., the number of colors in the raster image) of the raster image 120 (e.g., by merging certain regions as described in FIG. 11A) by at least 10% prior to being transmitted to the image analyzer 110.

The image analyzer 110 examines each pixel of the raster image 120 (e.g., a pixel may be the smallest addressable unit on a display screen and/or the raster image) and determines the color of each pixel and the color of its neighboring pixels (e.g., adjacent), according to one embodiment. In one embodiment, the image analyzer 110 determines whether adjacent pixels to a particular pixel have a same (or at least substantially similar) color as the particular pixel, so that regions (e.g., a continuous group of adjacent pixels having the same color) on the raster image 120 can be determined.

Figure 2A:
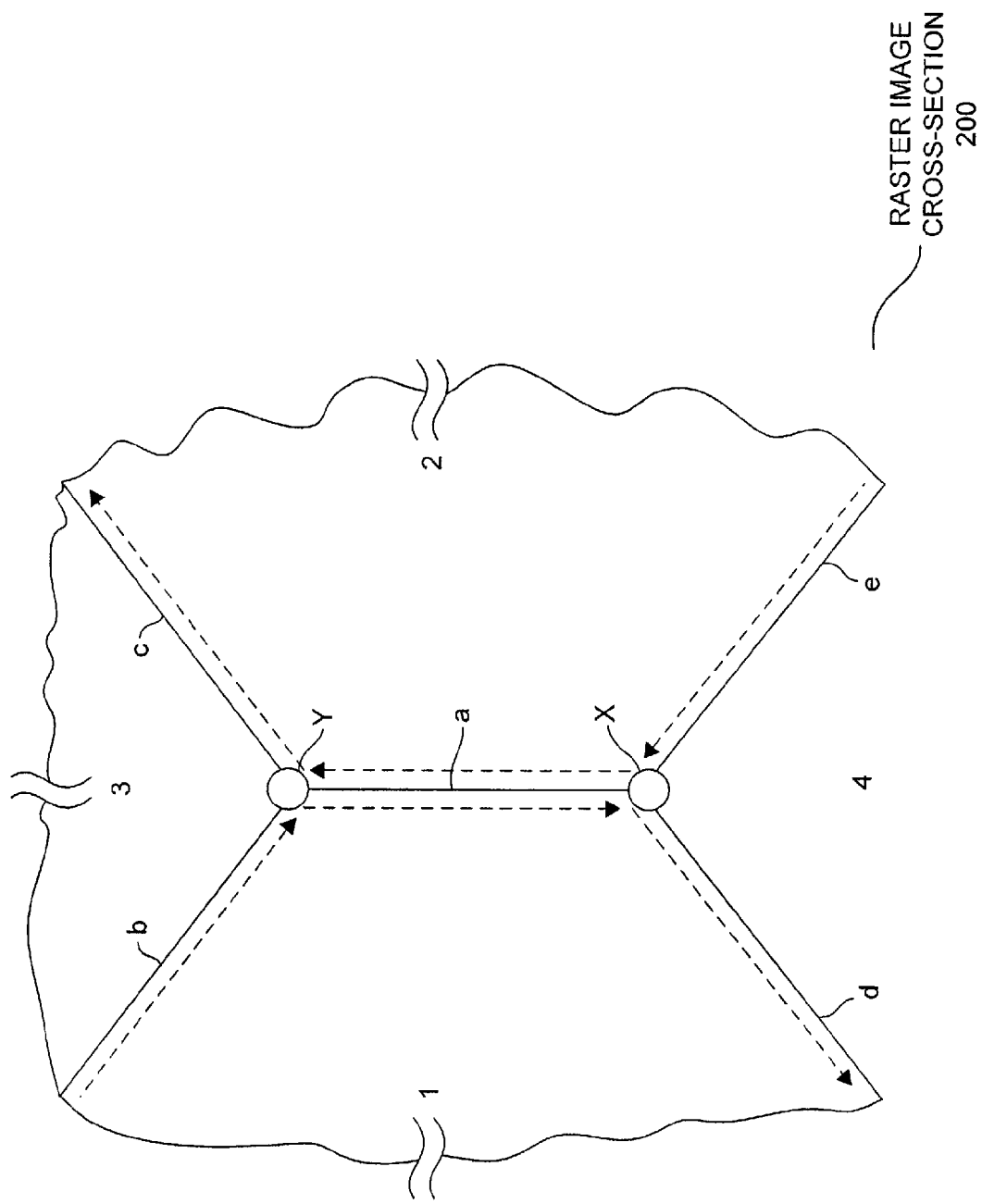
FIG. 2A is a cross sectional view of a raster image having a first region and a second region separated through a series of edges, according to an example embodiment.
Figure 3:
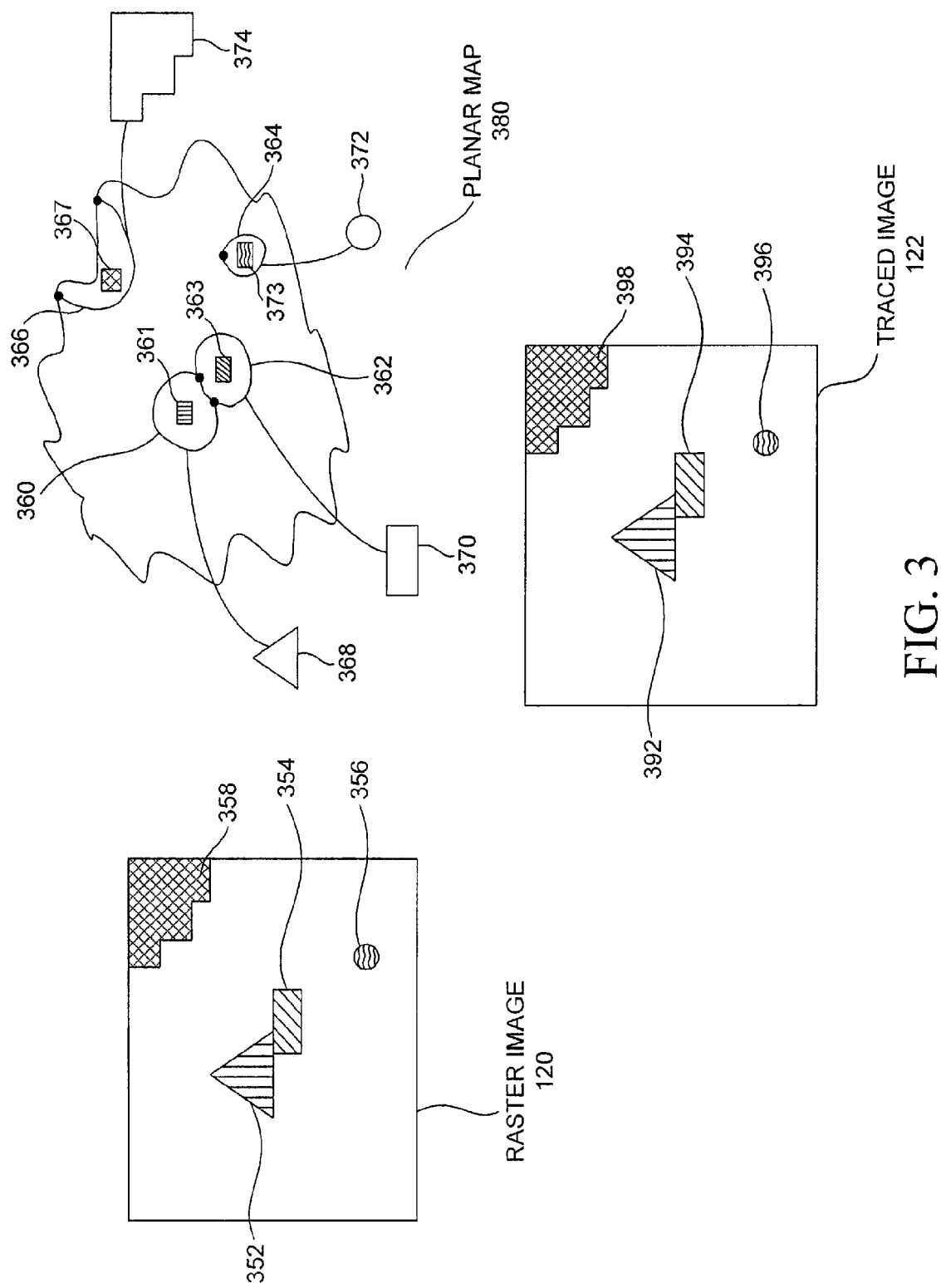
FIG. 3 is a translation view of the raster image being transformed to the planar map and a traced image, according to an example embodiment.

The image analyzer 110 can then analyze the raster image 120 by identifying the vertices, edges, and regions of the raster image 120. Examples of vertices, edges, and regions are described below with reference to FIG. 2A. FIG. 2A is a cross-section 200 of the raster image 120 according to one embodiment (e.g., the entire raster image 120 is illustrated in FIG. 3). There are two regions (e.g., a region may be a set of consecutive and/or adjacent pixels having the same color) illustrated in the cross-section 200 of FIG. 2A. A first region ('1') and a second region ('2') are separated by an edge ('a') in FIG. 2A.

The edge 'a' represents a boundary between two regions, the first region '1' and the second region '2'. Illustrated in FIG. 2A are additional edges 'b' and 'c' which represent boundaries between regions '1' and '2' respectively and a region '3', and edges 'd' and 'e' which represent boundaries between regions '1' and '2' respectively and a region '4'. In one embodiment, edges are transition boundaries between a region having one color (e.g., each region may exhibit a predetermined level of color uniformity), and another region having a different color (e.g., the regions '1', '2', '3', and '4' may all have different colors).

Also illustrated in FIG. 2A are two vertices 'X' and 'Y'. The vertex 'X' and the vertex 'Y' represent intersection points of three or more regions (e.g., connection points between multiple edges). The vertex 'X' in FIG. 2A represents an intersection point of the region '1', the region '2', and the region '4'. The vertex 'Y' in FIG. 2A represents an intersection point of the region '1', the region '2', and the 'region 3'.

FIG. 2B is a table view of a planar map table 250 used in connection with the cross section 200 of FIG. 2A to generate a planar map 380 (e.g., as illustrated in FIG. 3), according to the one embodiment. Attributes such as an edge name 252, a vertices start/end 254, a left/right faces 256, a left traverse preceding/succeeding edge 258, and a right traverse preceding/succeeding edge 260 are maintained within the planar map table 250 of FIG. 2B. Illustrated in FIG. 2B is an example entry for the edge 'a' of the cross section 200 of FIG. 2A. The edge 'a' has associated with it (see FIGS. 2A and 2B) a starting vertex of X, an ending vertex of Y, a left face of '1', a right face of '2', a preceding left traverse path (e.g., if the raster image 120 is traced) of edge 'b', and a succeeding left traverse path of edge 'd', and a preceding right traverse path of edge 'e', and a succeeding right traverse path of edge 'c'. In one embodiment, the planar map table 250 is stored within the planar map generator module 112 of FIG. 1.

Referring back to FIG. 1, the image analyzer 110 of FIG. 1 organizes each of the vertices, edges, and regions into a planar map table 250 (e.g., as illustrated in FIG. 2B) using a vertex generator module 114, an edge generator module 116 and a region generator module 118. The vertex generator module 114 identifies each vertex in the raster image 120. The region generator module 118 identifies each region of the raster image 120. The edge generator module identifies each edge in the raster image 120, and may determine the topology of each region relative to other regions (e.g., using the unidirectional vector paths as described in FIG. 4).

In one embodiment, a crack dictionary synchronizer 124 (e.g., a synchronizer that keeps track of what boundaries, or cracks, have been visited or traversed) is associated with the image analyzer 110 of the tracing engine module 108 to reference a crack dictionary 126 and determine whether a particular pixel of the raster image has been visited or traversed before. The crack dictionary synchronizer 124 may keep track of what boundaries (e.g., pixels and/or edges) have been previously traversed during an analysis process of pixels associated the raster image 120, and the crack dictionary 126 may be a data structure (e.g., a database) having information about previously traversed boundaries (e.g., particular pixels and/or edges).

After the image analyzer 110 processes the raster image 120, it is passed to a planar map generator module 112. The planar map generator module 112 of FIG. 1 creates a planar map (e.g., a map representing the raster image 120 having regions, vertices, and edges) by locating contiguous blocks of pixels in the raster image 120 where the color is the same (or substantially the same) to identify regions, and determining boundaries of the regions to identify edges and vertices. An example of a planar map 380 is illustrated in FIG. 3.

Referring now to FIG. 3, planar map 380 represents the connective and/or topological relationships between various regions of the raster image 120 as illustrated in FIG. 3. Furthermore, the planar map 380 of FIG. 3 may be decorated with accurate geometric and/or color information about regions and their boundaries of the raster image 120. Having both topological and geometric information about the raster image 120 may be needed to manipulate the raster image 120 and to generate a traced image 122.

Specifically, the raster image 120 of FIG. 3 is illustrated as having three graphical objects, a triangle 352, a rectangle 354, a circle 356, and a staircase corner 358. The planar map 380 of FIG. 3 determines the color of the triangle 352 as a color 361, the color of the rectangle 354 as a color 363, the color of the circle 356 as the color 373, and the color of the staircase corner 358 as the color 367 (e.g., the planar map 380 may determine the colors by referencing a color index, such a Pantone color index, etc.). Furthermore, the planar map 380 of FIG. 3 identifies the geometry of the triangle 352 as geometry 368, the geometry of the rectangle 354 as a geometry 370, the geometry of the circle 356 as the geometry 372, and the geometry of the staircase corner 358 as the geometry 374. In addition, the planar map 380 identifies a region 360, a region 362, a region 364, and a region 366. There are multiple edges surrounding each of the regions 360-366 of the raster image (e.g., a transition from one colored region to another colored region). In one embodiment, the background of the raster image 120 may form an additional region. Also, in one embodiment, the geometry of a region may be distributed among the edges in such a way that each edge knows about the correct geometry and doesn't produce gaps because a edge between the triangle 352 and the rectangle 354 may have a piece of the geometry between the triangle 352 and the rectangle 354 and thereby avoiding gaps. Various vertices (e.g., black dots) are also identified on the planar map 380, where there is an intersection point of three different regions on the raster image 120 (e.g., for shapes solely having only two region intersection points such as the circle 356, an arbitrary vertex (black dot) may be placed for identification purposes as illustrated in planar map 380).

Once the planar map 380 has fully captured connective and/or topological relationships, the traced image 122 can be generated after an effects module 106 and a graphics user interface module 104 of the processing module 100 of FIG. 1 prepare the processed image for display. The traced image 122 of FIG. 3 is a curve-based (e.g., Bezier curve-based) object representation of the raster image 120 that can be edited by graphics programs, according to one embodiment. For example, the triangle 352, the rectangle 354, the circle 356, and the staircase corner 358 of the raster image 120 are represented by a triangular object 392, a rectangular object 394, a circle object 396, and a staircase corner object 398, in the traced image 122.

Figure 4:
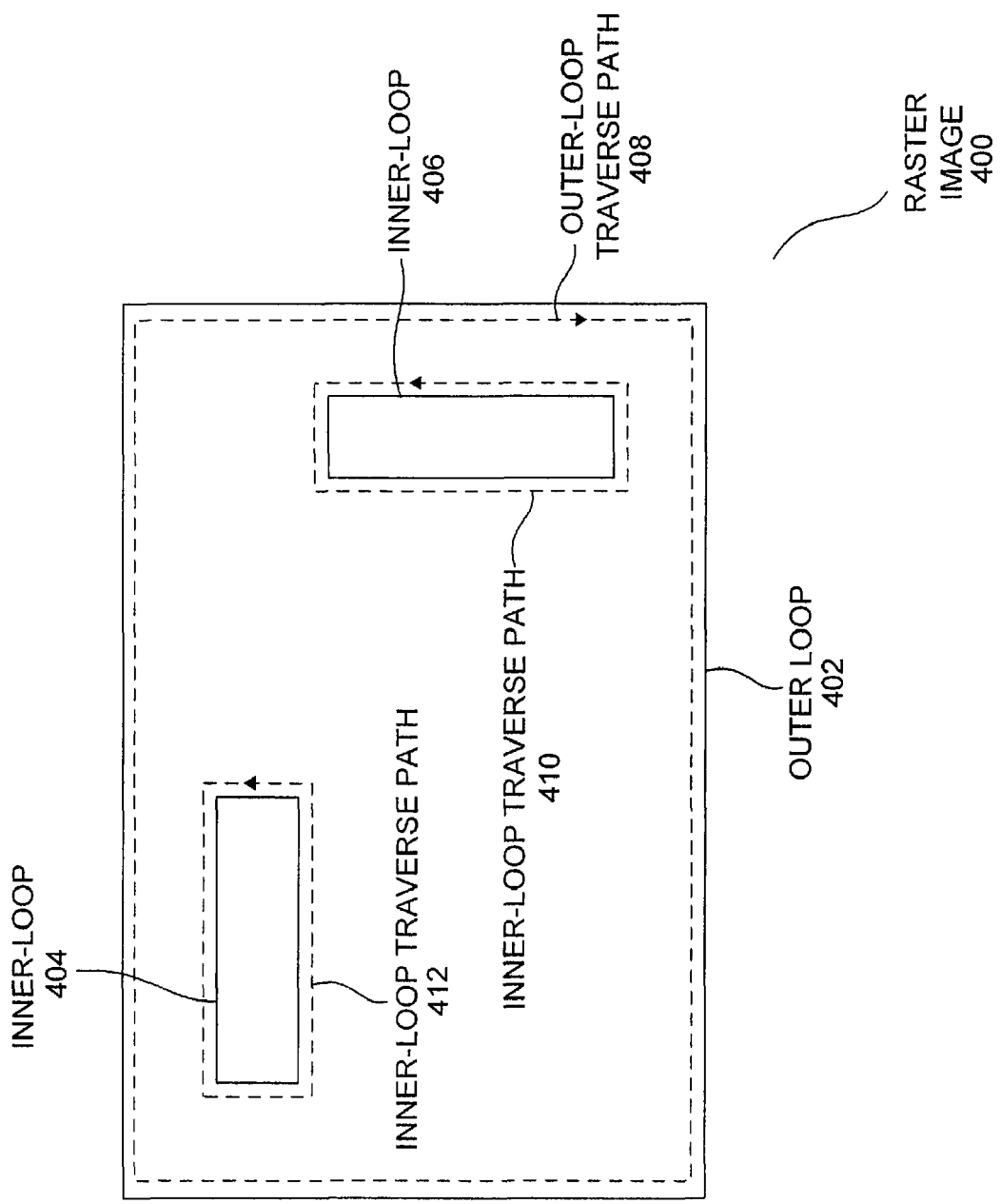
FIG. 4 is an image view of a raster image traced using edges oriented both clockwise and anti-clockwise, according to an example embodiment.

In certain embodiments of a raster image (e.g., a raster image having inner and outer loops, such as a raster image 400 as illustrated in FIG. 4), orientation based rules can be applied to each of the regions of the raster image 400 (e.g., so that a tracing algorithm can determine whether a particular object is inside another structure). In one embodiment, the regions/faces of the planar map 380 may have a list of "entry edges" (e.g., an entry edge may be one arbitrary edge on the boundary) for each of its outer and/or inner boundaries. In this embodiment, an arbitrary list of inner boundaries/edges for each region/face may be maintained and knowing each inner boundary may be required for image processing.

In the embodiment of FIG. 4, inner-loops (e.g., an inner-loop 404 and an inner-loop 406) are objects within another object of the raster image 400. For example, the inner-loop 404 and the inner-loop 406 are fully contained in the outer-loop 402 (e.g., the outer-loop 402 encompasses the inner-loop 404 and the inner-loop 406). The traverse paths (e.g., unidirectional vector path directions with which an algorithm performs tracing of the raster image 400 using a planar map) of inner-loops and outer-loops are opposite, so that a system (e.g., a data processing system) can determine whether a particular object is associated with an inner loop or an outer loop, and therefore determine the relative topology of the various regions of the raster image (e.g., whether a particular region is above or below another region when converted into a traced image). For example, the inner-loop traverse path (e.g., an inner-loop traverse path 410 and an inner-loop traverse path 412 as illustrated in a raster image 400 of FIG. 4) may be assigned a counter-clockwise orientation. Outer-loop traverse paths (e.g., an outer-loop traverse path 408) may be assigned a clockwise orientation. As a result, the system can determine that a region inside the inner-loop 404 and a region inside the inner-loop 406 are encompassed by, inside, and/or contained by a region whose outer-loop is 402. In one embodiment, the orientation can be determined before, during, and/or after traversal of a path.

Figure 5:
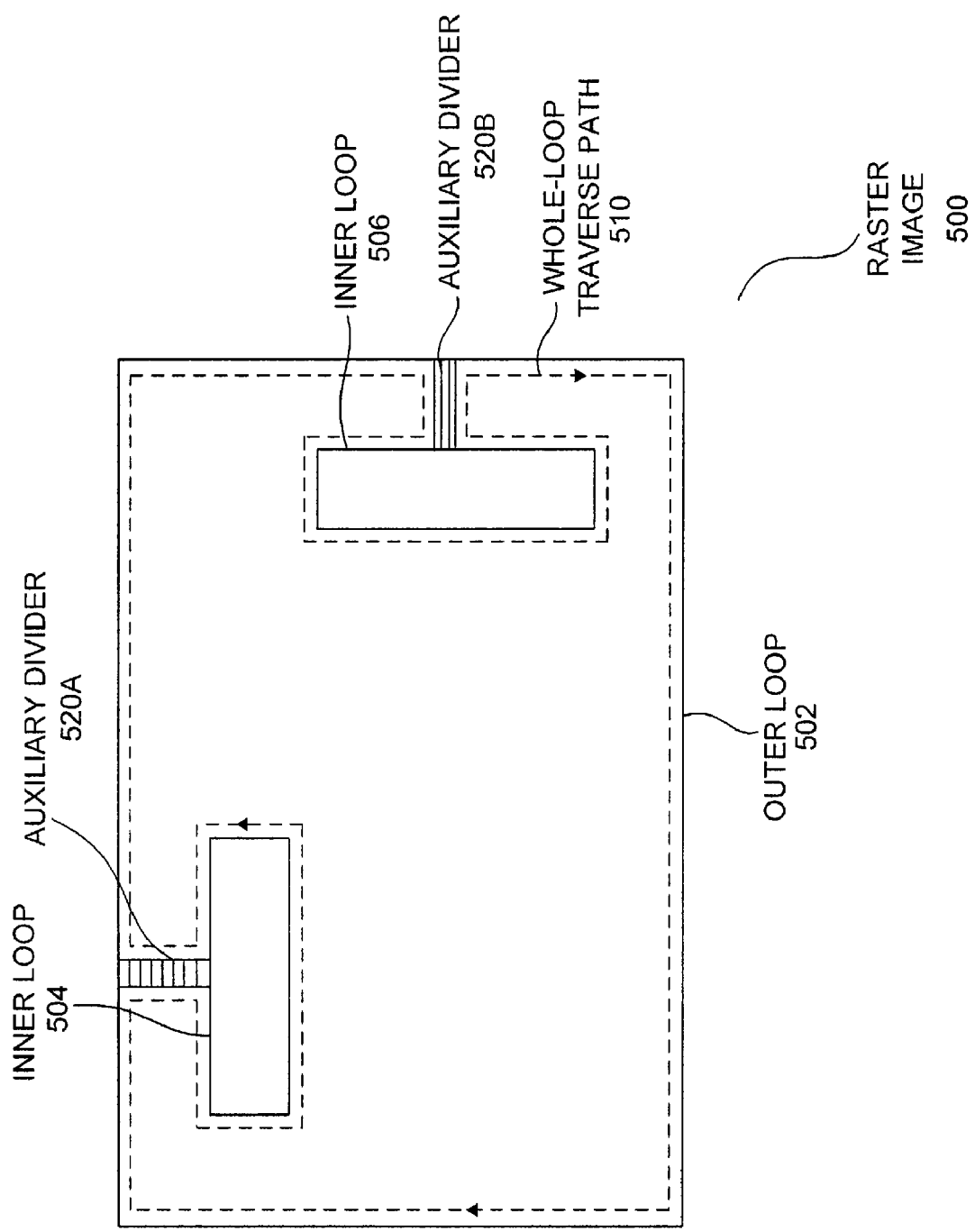
FIG. 5 is an image view of a raster image traced using edges oriented in a single direction, according to an example embodiment.

FIG. 5 illustrates a further example of a raster image (e.g., a raster image having inner and outer loops, such as a raster image 500). An auxiliary divider module 128 as illustrated in FIG. 1 may be used in conjunction with the planar map generator module 112 to avoid the need for orientation of inner-loops and outer-loops. Particularly, the auxiliary divider module 128 may be used by the planar map generator module 112 to create auxiliary dividers 520 as illustrated in FIG. 5. In FIG. 5, a first auxiliary divider 520A is placed between the inner loop 504 and an outer loop 502, and a second auxiliary divider 520B is placed between the inner loop 506 and the outer loop 502. By placing the auxiliary dividers 520, only one traverse path (e.g., a whole-loop traverse path 510) is required to process the raster image 500. In one embodiment, the auxiliary divider module 128 generates at least one auxiliary divider in the raster image 120, and applies a single unidirectional vector path (e.g., the whole-loop traverse path 510) to the raster image 120 based on the at least one auxiliary divider (e.g., the auxiliary divider 520A).

The raster image 500 embodiment of FIG. 5 differs from the raster image 400 embodiment of FIG. 4 in that the raster image 500 utilizes only a single traverse path (the whole-loop traverse path 510) to trace the image. The single loop traverse path is made possible by the application of the auxiliary dividers 520, by applying the auxiliary divider module 128 of FIG. 1, to the raster image 500. In contrast, the raster image 400 embodiment of FIG. 4 utilizes three traverse paths (the inner-loop traverse path 404, the inner-loop traverse path 406, and the outer loop traverse path 408). The use of the auxiliary dividers 520 may be beneficial in certain embodiments, and may not be beneficial in others. For example, in one embodiment, the raster image 400 of FIG. 4 may be traced with greater accuracy because regions are not blocked through the use of auxiliary dividers. In one embodiment, the raster image 500 of FIG. 5 may be traced more efficiently (e.g., more quickly) because only a single traverse path is required through the use of the auxiliary dividers 520.

Referring back to FIG. 1, once the raster image 120 is processed by the planar map generator module 112 (e.g., into a processed image), the processed image is communicated to the effects module 106. In one embodiment, a merge module 130 of the effects module 106 automatically merges certain adjacent regions of the raster image based on a heuristic algorithm (e.g., a problem-solving technique in which the most appropriate solution of several found by alternative methods is selected at successive stages of a program for use in the next step of the program). In one embodiment the heuristic algorithm considers a physical region size, a color similarity between neighboring regions using a scoring matrix (e.g., a scoring matrix 1150), the planar map 380, and/or a thickness of adjacent regions having the same color in relation to other neighboring regions having a different color. The effects module 106 may also automatically remove artifacts and noise from the processed image based on a threshold number of pixels (e.g., the threshold number of pixels may be set by a user of the processing module 100). For example, the user may request that all regions having ten pixels or less be merged into neighboring regions (e.g., the user may set the threshold number of pixels to 10 pixels).

It is also appreciable that, in FIG. 1, the merge module 130 may communicate with a four connector module 132 and an eight connector module 134. The four connector module 132 allows the merge module 130 to perform a merge operation through an edge (e.g., a merge operation horizontally, and/or vertically from a particular pixel being merged) in one embodiment. The eight connector module 134 allows the merge module 130 to perform a merge operation through either an edge and/or a vertex (e.g., a merge operation diagonally, horizontally, and/or vertically to a particular pixel being merged) in another embodiment.

Figure 11A:
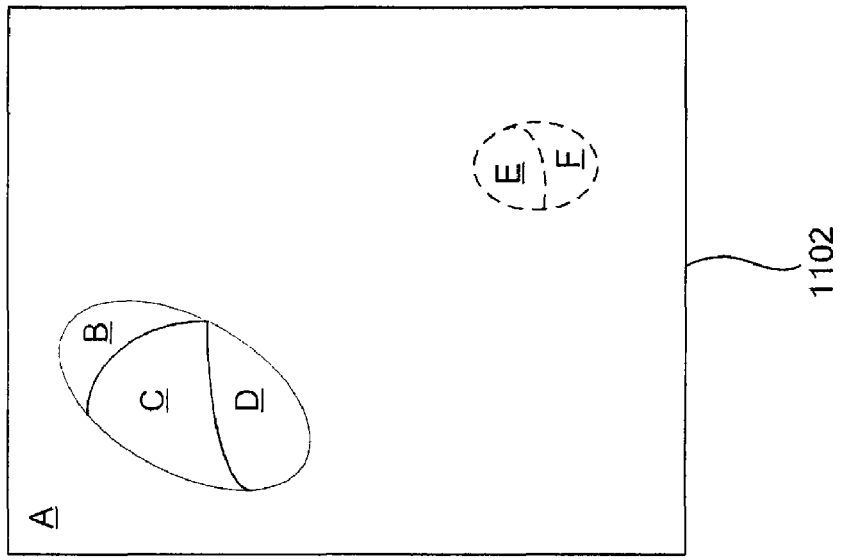
FIG. 11A is an image view of at least certain regions of a raster image being merged, according to an example embodiment.

To illustrate the operation of the merge module 130 of FIG. 1, FIG. 11A is an image view of at least certain regions of a raster image 1100 being merged by the merge module 130 of FIG. 1, according to one embodiment. In FIG. 11A, the raster image 1100 includes regions A, B, C, D, and E (e.g., may also contain a background-style region F). After the merge module 130 of FIG. 1 operates on the raster image 1100 of FIG. 11A, a new raster image 1102 is formed, in which two regions E and F have been merged into region A. For example, the regions E and F may be smaller than a threshold number of pixels, or may have a high degree of color similarity with region A.

In one embodiment, the merge module 130 of FIG. 1 determines the rank of a plurality of regions (e.g., regions A, B, C, D, and E) of the raster image 1100 in a scoring matrix (e.g., a scoring matrix 1150 as illustrated in FIG. 11B) based on color similarities between each of the plurality of regions (e.g., a merging order associated with the merging of certain regions may be based on a hierarchy of color similarity, and neighboring regions having greater color similarity are merged before other neighboring regions having lesser color similarity). For example, FIG. 11B illustrates a table arranged as the scoring matrix 1150 in which various regions, their color, and the color similarity of their nearest neighboring region is captured. A score is associated with each region based on its similarity with a neighboring region.

In one embodiment, the storing matrix 1150 is stored within the merge module 130 of FIG. 1. In other embodiments, the scoring matrix 1150 may not be considered and regions smaller than a threshold number of pixels (e.g., a threshold set by a user) may be automatically merged (e.g., to automatically remove artifacts and noise from the raster image based on the threshold number of pixels).

Figure 12:
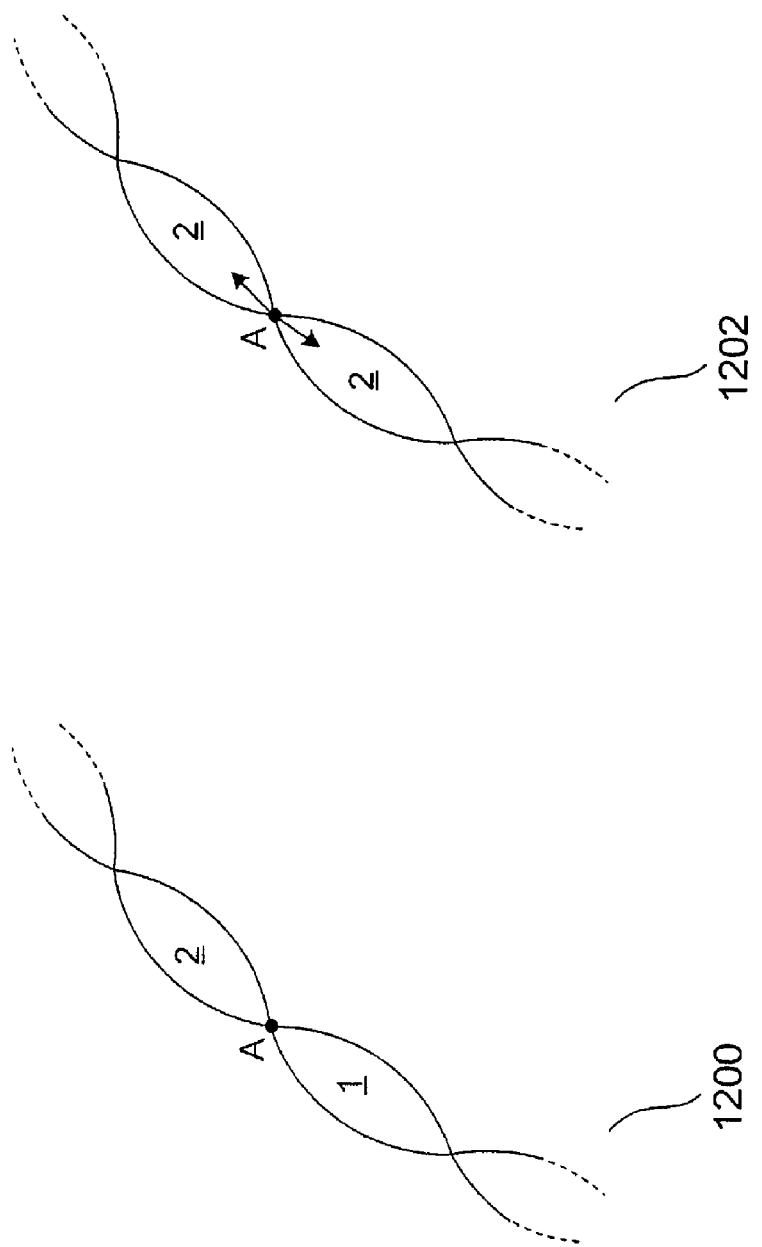
FIG. 12 is a slice view of two regions being merged using an eight-connected algorithm, according to an example embodiment.

Other operations of the merge module 130 of FIG. 1 can also be understood by considering FIG. 12. FIG. 12 is a slice view of two regions (regions 1 and 2) being merged using an eight-connected algorithm, according to one embodiment. Specifically, in FIG. 12, the regions 1 and 2 are merged into region 2, across a diagonal vertex point. As such, a slice view 1200 having two regions 1 and 2, is transformed into a slice view 1202 having only one merged region 2. The slice view 1202 is eight-connected (e.g., a merge operation diagonally, horizontally, and/or vertically to a particular pixel being merged) in that the two regions of the slice view 1200 have been connected across a diagonal vertex point A. In one embodiment, regions may be merged in an 8-connected fashion when their colors are exactly the same without scoring (e.g., a small region adjacent to a large region having the same color).

The slice view 1200 is four-connected (e.g., a merge operation horizontally, and/or vertically from a particular pixel being merged) in that two regions have not been connected across the diagonal vertex point A. In one embodiment, certain regions are automatically merged (e.g., either through an eight-connected and/or a four-connected algorithm) through at least one of an edge and a vertex based on the scoring matrix 1150 of FIG. 11B. Furthermore, a direction vector may be associated with two regions to indicate a merge direction. For example, regions that have a smaller area (e.g., thinner regions) may be best candidates for merging than regions that are have a large area of pixels (e.g., thicker regions).

Figure 13:
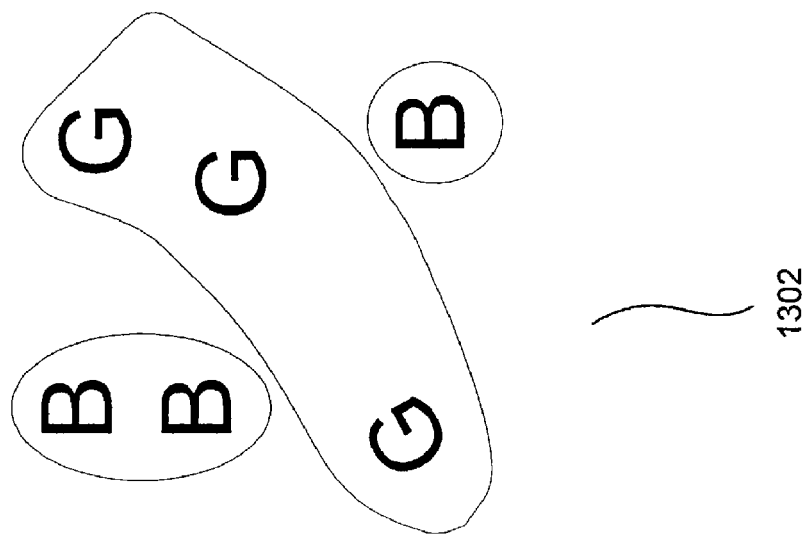
FIG. 13 is a zoom view of pixels being merged using a four-connected algorithm and the eight algorithm, according to an example embodiment.
Figure 13:
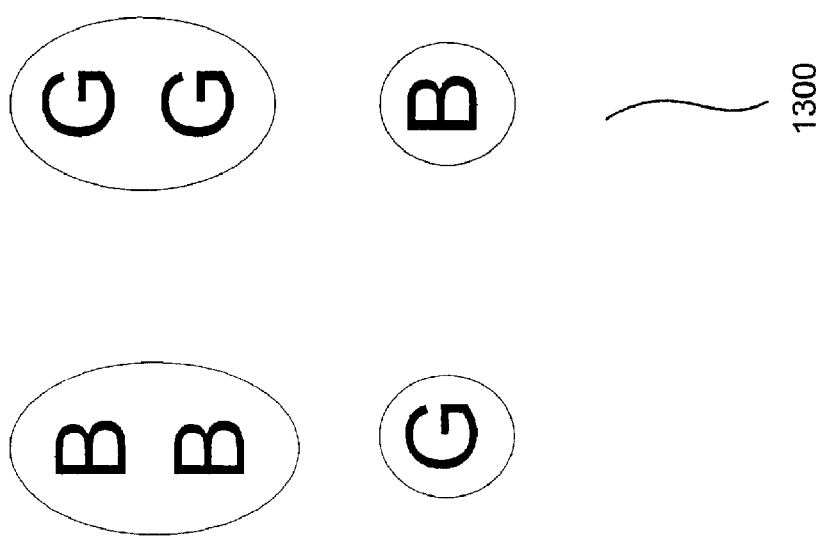

To illustrate the concept of the merge direction, consider FIG. 13. FIG. 13 is a zoom view of pixels being merged using a four-connected algorithm and the eight-connected algorithm, according to one embodiment. Vertically oriented blue pixels (B, B) and the vertically oriented green pixels (G, G) in a zoom view 1300 have been merged, but the isolated green pixel (G) and the isolated blue pixel (B) at the bottom of the zoom view 1300 have not been merged. Since the zoom view 1300 is four-connected, there is no possibility of merging the blue pixel (B) at the bottom with the merged blue pixels (B,B) to the north-west of the blue pixel at the bottom (B). Furthermore, there is no possibility of merging the green pixel (G) at the bottom with the merged green pixels (G,G) to the north-east of the green pixel at the bottom (G).

If the merge direction is north-east, an eight-connected algorithm would merge the green pixels as illustrated in a zoom view 1302. However, if the merge direction is north-west, the blue pixels would be merged. Therefore, the merge direction helps to determine which directions pixels are to be merged when there are multiple options for merging. In one embodiment, merge directions may be an input to the remove module 136 of FIG. 1 to enable the remove module 136 to operate. Furthermore, the merge directions may be recorded in a vertex data structure created by the vertex generator module 114 of FIG. 1.

Referring back to FIG. 1, after the merge module 130 performs merging operations, a remove module 136 in the effects module 106 may automatically update vertices and edges (e.g., by removing certain elements such as particular vertices and/or particular edges) of the planar map 380 (e.g., created by the planar map generator module 112 of FIG. 1) as illustrated in FIG. 3 based on at least one operation of the merge module (e.g., an operation such as merging of regions of the raster image 120).

Figure 14:
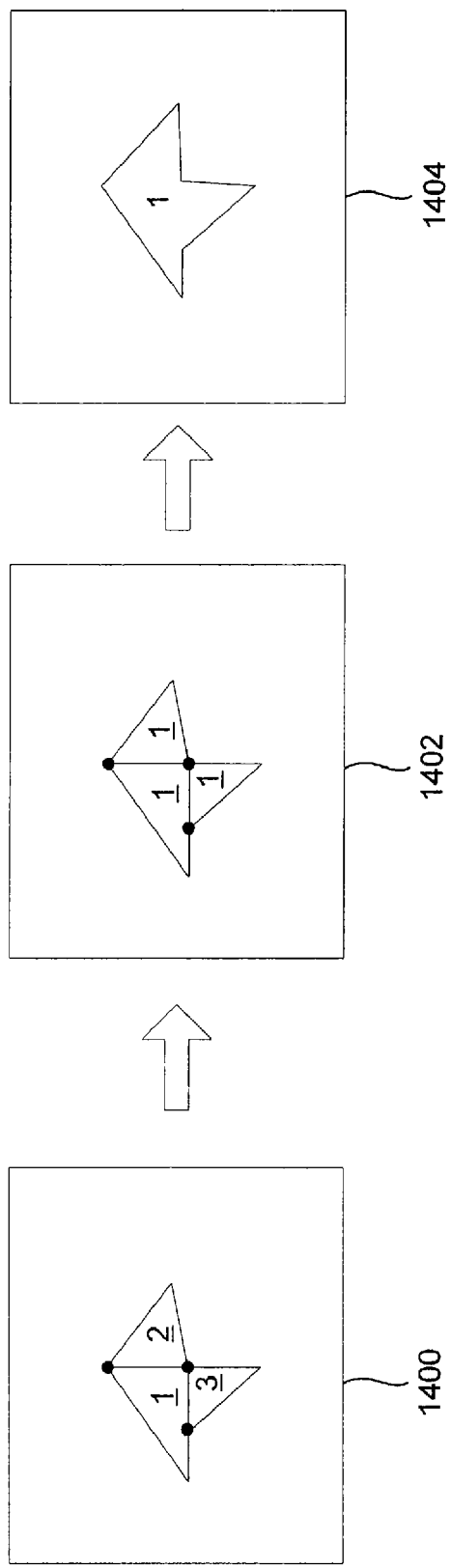
FIG. 14 is a process view of a planar map edge and/or vertex removal process, according to an example embodiment.

To illustrate the operations of the remove module 136 of FIG. 1, consider FIG. 14. FIG. 14 is a process view of a planar map edge and/or vertex removal process, according to one embodiment. In FIG. 14, a planar map 1400 includes regions 1, 2, and 3, and three edges. Regions of the planar map are merged (e.g., through application of the merge module 130 of FIG. 1), and a new intermediate planar map 1402 is temporarily created illustrating three regions adjacent to each other each having the same color as the region 1 of the planar map 1400. It should be noted that the color of region 1 may not necessarily be the same as the merged color. In some embodiments, the merged color may be determined based on a heuristic algorithm (e.g., weighted average color determined based on a physical region size, a color similarity between neighboring regions, etc). The planar map 1402 is transformed using the remove module 136 of FIG. 1 into a planar map 1404 by removing at least one of the edge and the vertex from planar map 1402 which had originally had three separate regions (e.g., because the original raster image did not include merged regions as illustrated in the planar map 1400).

It should be noted that during region merging using the merge module 130, an entropy data structure 137 of the effects module 106 may be referenced (e.g., applied, etc.). In one embodiment, the entropy data structure 137 maintains a delta of at least one previous color (e.g., the previous color may be derived from at least two regions previously merged) and a current color (e.g., the current color may be a mean of the at least one previous color and the current color) of a particular region when the particular region is merged. For example, the entropy data structure 137 may indicate that neighboring regions are not to be updated when a difference between the previous color and the current color is small (e.g., a difference of only three gradients), and only update neighboring regions when the difference is large (e.g., twenty gradients) and/or exceeds a preset (or dynamically determined) threshold (e.g., it will be appreciated that the previous color may be the color last maintained during an update to neighbors).

Figure 11A:
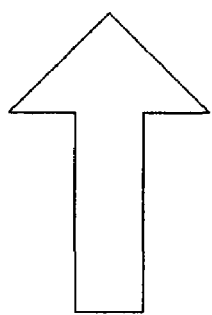
Figure 11A:
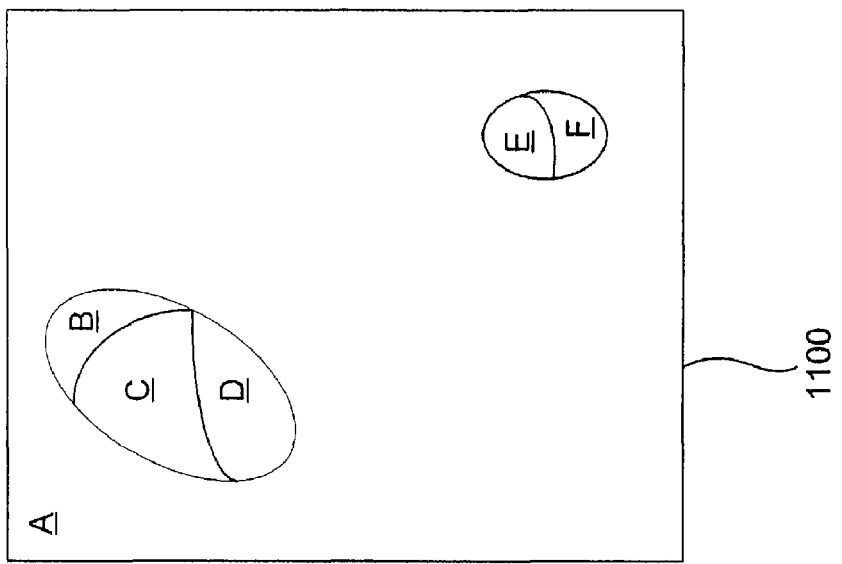

In one embodiment, merging of any regions on a raster image (e.g., merging regions of the raster image 1100 of FIG. 11A using the merge module 130 of FIG. 1) updates the entropy data structure 137. Neighboring regions to merged regions may be updated when the entropy data structure 137 exceeds a limit value (e.g., a threshold value set by a user). In addition, the entropy data structure 137 may be updated with a delta (e.g., difference) of at least one previous color (e.g., the last color, and/or the color last reported to neighbors) and a current color of a particular region when the particular region is merged. The current color may be a mean of the at least one previous color and the current color, and the previous color may derived from at least two regions previously merged (e.g., a mean of the colors of the regions being merged, balanced by the color history of the current color). In such an embodiment, the entropy data structure 137 may control the updating of the scoring matrix 1150 (e.g., as illustrated in FIG. 11) in one embodiment. For example, if a region is to be merged, its adjacent region's position in the scoring matrix 1150 may be updated when the entropy difference is large enough (e.g., the adjacent region's scoring may go higher/lower in the scoring matrix as appropriate).

Figure 6:
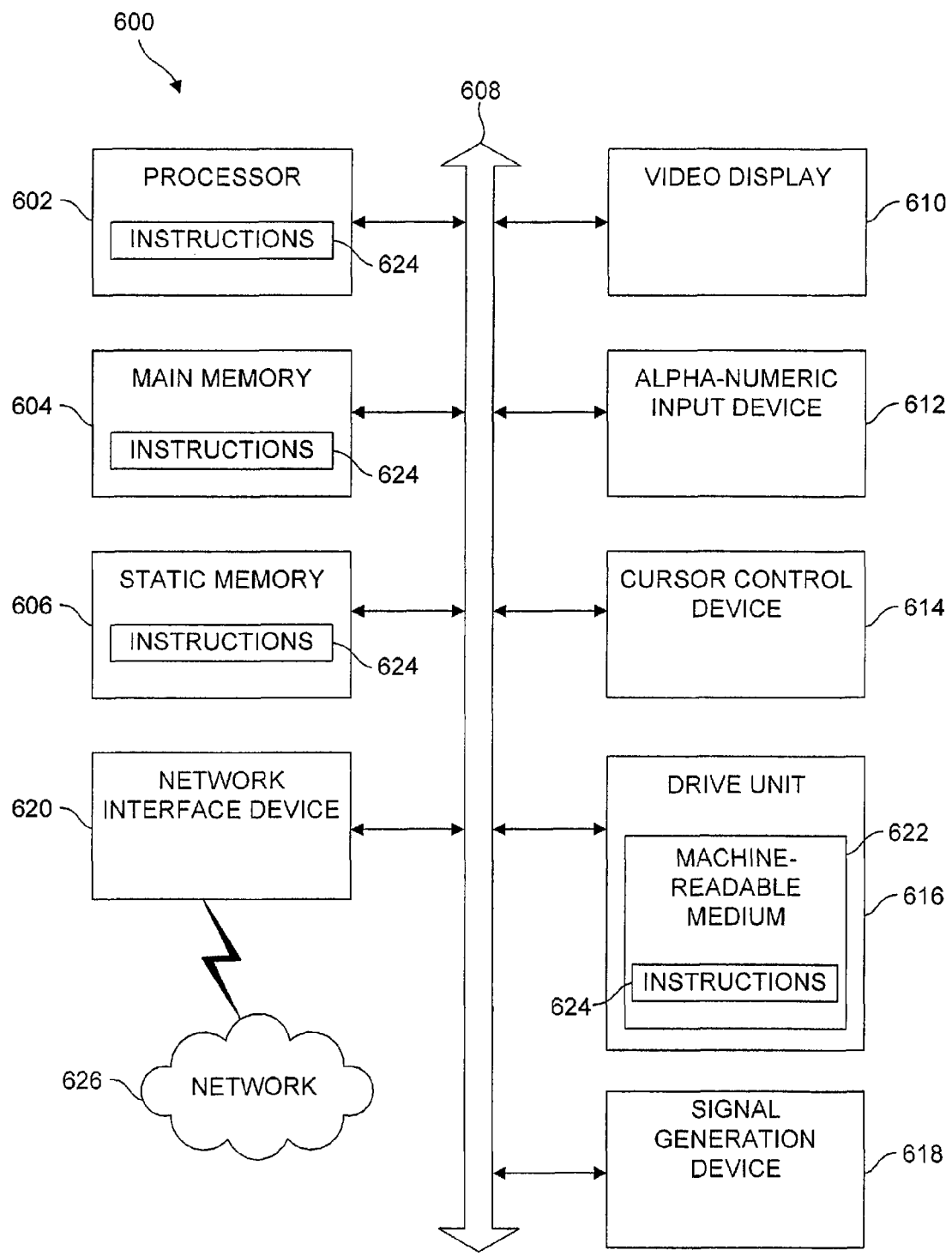
FIG. 6 shows a diagrammatic representation of machine in the example form of a computer system in which a set of instructions, for causing the machine to perform any one or more of the methodologies discussed herein may be executed, according to any example embodiment.

FIG. 6 shows a diagrammatic representation of machine in the example form of a computer system 600 within which a set of instructions, for causing the machine to perform any one or more of the methodologies discussed herein, may be executed. In various embodiments, the machine operates as a standalone device and/or may be connected (e.g., networked) to other machines. In a networked deployment, the machine may operate in the capacity of a server and/or a client machine in server-client network environment, and/or as a peer machine in a peer-to-peer (or distributed) network environment. The machine may be a personal computer (PC), a tablet PC, a set-top box (STB), a Personal Digital Assistant (PDA), a cellular telephone, a web appliance, a network router, switch and/or bridge, an embedded system and/or any machine capable of executing a set of instructions (sequential and/or otherwise) that specify actions to be taken by that machine. Further, while only a single machine is illustrated, the term "machine" shall also be taken to include any collection of machines that individually and/or jointly execute a set (or multiple sets) of instructions to perform any one and/or more of the methodologies discussed herein.

The example computer system 600 includes a processor 602 (e.g., a central processing unit (CPU) a graphics processing unit (GPU) and/or both), a main memory 604 and a static memory 606, which communicate with each other via a bus 608. The computer system 600 may further include a video display unit 610 (e.g., a liquid crystal display (LCD) and/or a cathode ray tube (CRT)). The computer system 600 also includes an alphanumeric input device 612 (e.g., a keyboard), a cursor control device 614 (e.g., a mouse), a disk drive unit 616, a signal generation device 618 (e.g., a speaker) and a network interface device 620.

The disk drive unit 616 includes a machine-readable medium 622 on which is stored one or more sets of instructions (e.g., software 624) embodying any one or more of the methodologies and/or functions described herein. The software 624 may also reside, completely and/or at least partially, within the main memory 604 and/or within the processor 602 during execution thereof by the computer system 600, the main memory 604 and the processor 602 also constituting machine-readable media.

The software 624 may further be transmitted and/or received over a network 626 via the network interface device 620.

While the machine-readable medium 622 is shown in an example embodiment to be a single medium, the term "machine-readable medium" should be taken to include a single medium and/or multiple media (e.g., a centralized and/or distributed database, and/or associated caches and servers) that store the one or more sets of instructions. The term "machine-readable medium" shall also be taken to include any medium that is capable of storing, encoding and/or carrying a set of instructions for execution by the machine and that cause the machine to perform any one or more of the methodologies of the various embodiments. The term "machine-readable medium" shall accordingly be taken to include, but not be limited to, solid-state memories, optical and magnetic media, and carrier wave signals.

FIGS. 7A-7C are image diagrams illustrating a topological methodology of tracing and a cut-out methodology of tracing, according to any embodiment. In FIG. 7A, a traced image is shown having three regions (e.g., region 'A', region 'B', and region 'C'). In the embodiment of FIG. 7B, the three regions are separated topologically (e.g., a user may drag their mouse over any one of the regions and drag a region away without disrupting the structure of the other regions). In contrast, in the embodiment of FIG. 7C, removing a region creates a 'cut out' of regions encompassing the 'cut out' region. For example, as illustrated in FIG. 7C, cutting out the region 'C' out of the region 'B' leaves a cut out (e.g., hole) within the region 'B'. Both the embodiments illustrated in FIG. 7B and FIG. 7C are variations of methodologies to manage the traced image as illustrated in FIG. 7A, and may be used in connection with any of the embodiments illustrated in this disclosure.

Figure 8:
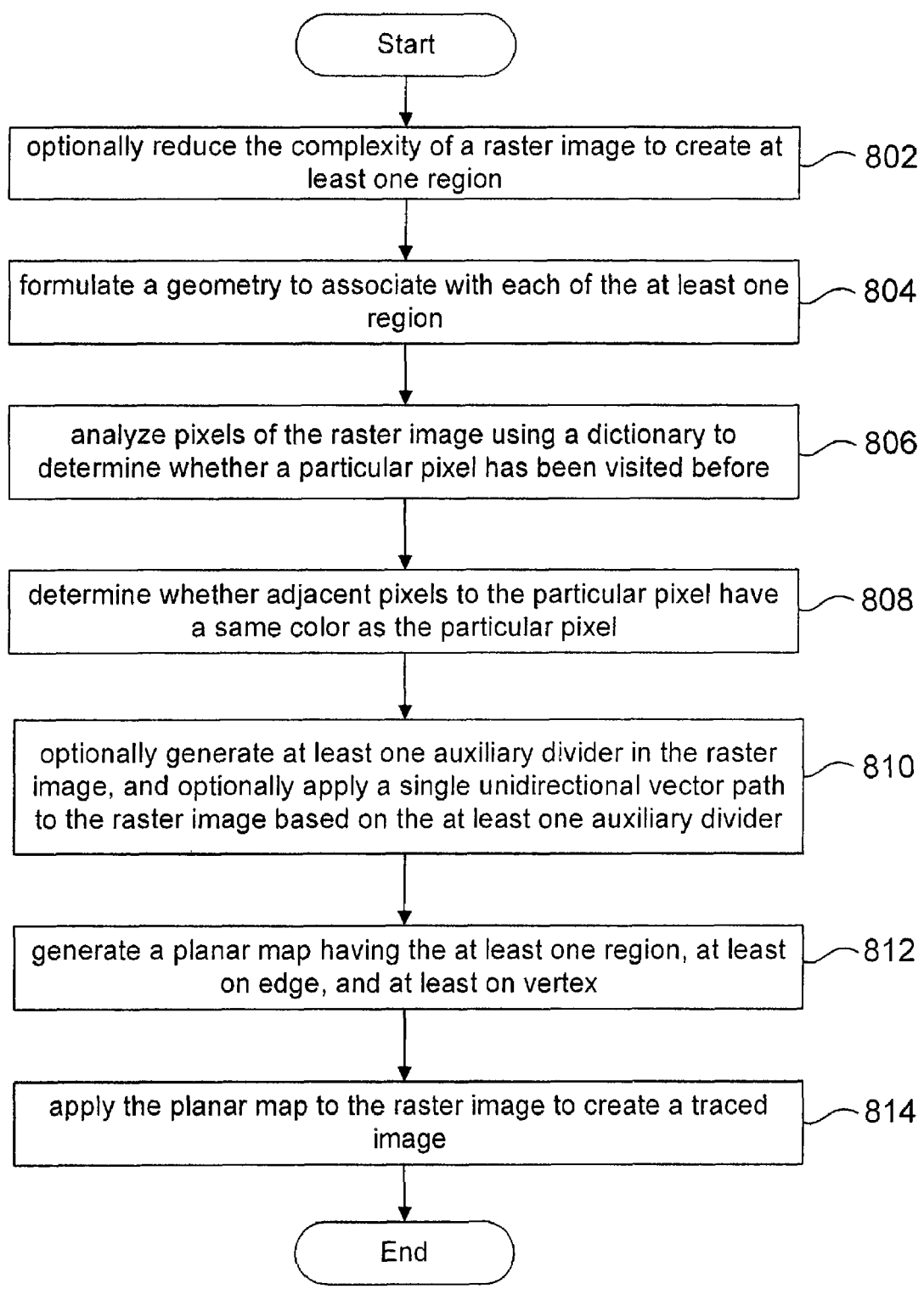
FIG. 8 is a process flow to generate the planar map, according to an example embodiment.

FIG. 8 is a flow chart illustrating a method to generate the planar map, according to at least the one embodiment. In operation 802, the complexity of a raster image (e.g., the raster image 120 of FIG. 3) is optionally reduced to create at least one region (e.g., the region 'B' of FIG. 7A). In operation 804, a geometry may be formulated to associate with each of the at least one region (e.g., as illustrated and described in FIG. 3). In operation 806, pixels of the raster image 120 may be analyzed using a dictionary (e.g., the crack dictionary 126 of FIG. 1) to determine whether a particular pixel has been traversed or visited before. It should be noted that in one embodiment, operation 806 occurs before, after, and/or during the operation 804. In operation 808, a determination may be made whether adjacent pixels to the particular pixel have a same color (or a substantially similar) as the particular pixel (e.g., using the image analyzer 110 of FIG. 1).

Then, in operation 810, at least one auxiliary divider (e.g., the auxiliary divider 520A of FIG. 5) may be optionally generated in the raster image (e.g., the raster image 500 of FIG. 5), and a single unidirectional vector path (e.g., the whole loop traverse path 510) may be optionally applied to the raster image (e.g., the raster image 500) based on the at least one auxiliary divider (e.g., the auxiliary divider 520A of FIG. 5).

Figure 9:
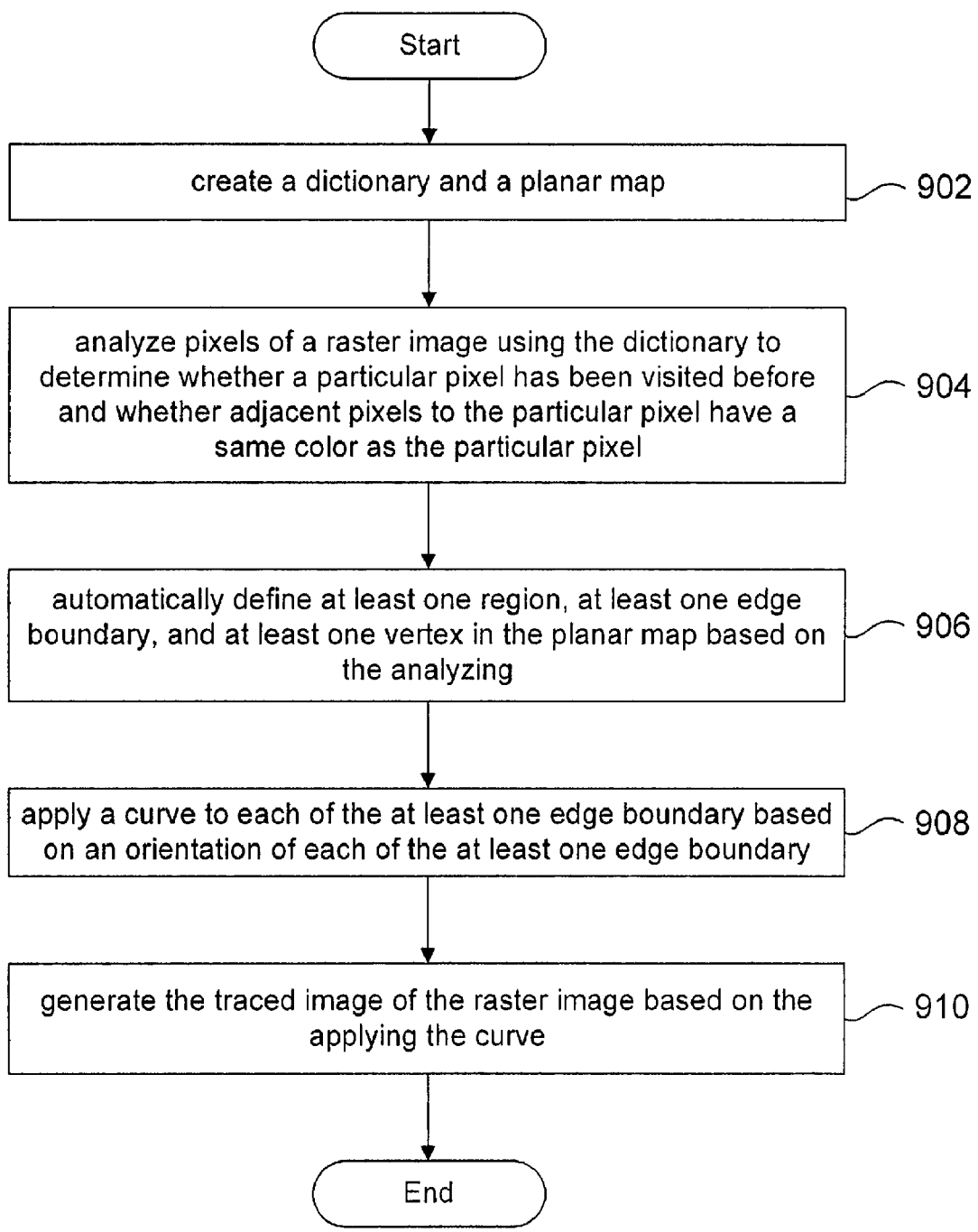
FIG. 9 is a process flow to prevent gaps in a traced image of the raster image, according to an example embodiment.

FIG. 9 is a flow chart illustrating a method to prevent gaps in a traced image (e.g., the traced image 122) of a raster image (e.g., the raster image 120), according to at least one embodiment. In operation 902, a dictionary (e.g., the crack dictionary 126 of FIG. 1) and a planar map (e.g., the planar map 380) may be created. In operation 904, pixels of a raster image (e.g., the raster image 120 of FIG. 1) may be analyzed using the dictionary (e.g., the crack dictionary 126) to determine whether a particular pixel has been traversed or visited before and whether adjacent pixels to the particular pixel have a same color as the particular pixel. In one embodiment, the dictionary may be a log, rather than a dictionary that merely contains information about previously traversed or visited pixels.

Next, in operation 906, regions, boundaries, and vertices in the planar map (e.g., the planar map 380) may be automatically defined based on the analysis performed in operation 904. In operation 908, a curve (e.g., the Bézier curve) may be applied to each of the edge boundaries (e.g., a closed loop of edges), based on an orientation of each of the at edge boundaries (e.g., clockwise and/or anticlockwise based on whether a region is an inner-loop and/or an outer-loop as described in FIG. 4). Finally, in operation 910, the traced image (e.g., the traced image 122 of FIG. 3) may be generated of the raster image 120 based on the applying the curve.

Figure 10:
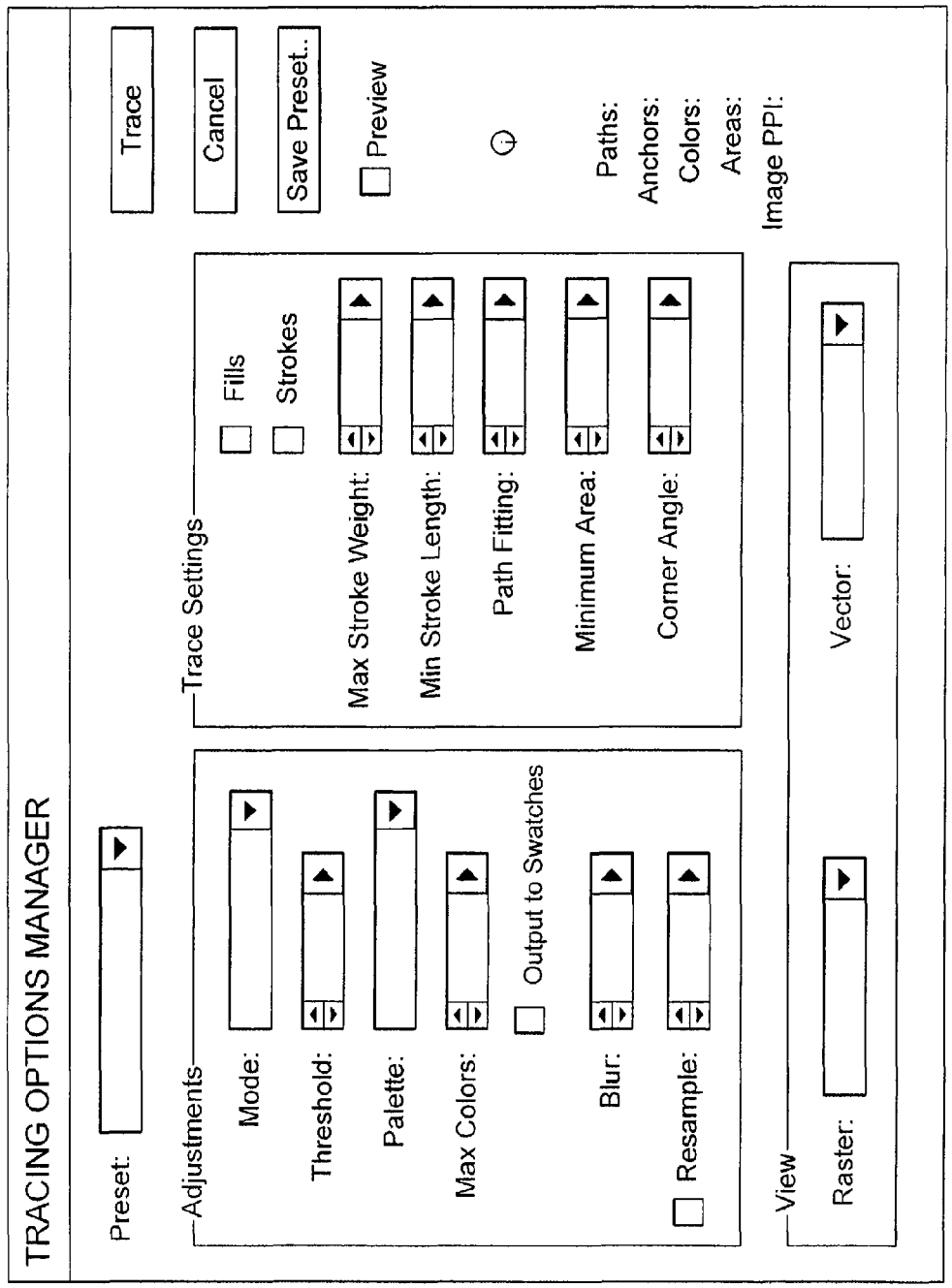
FIG. 10 is a graphical user interface view of a tracing options manager, according to an example embodiment.

FIG. 10 is diagrammatic representation of a graphical user interface 1000 of a tracing options manager, according to at least the one embodiment. The graphical user interface 1000 of FIG. 10 illustrates a tracing options manager that controls various aspects including mode, threshold adjustments and trace settings.

Figure 15:
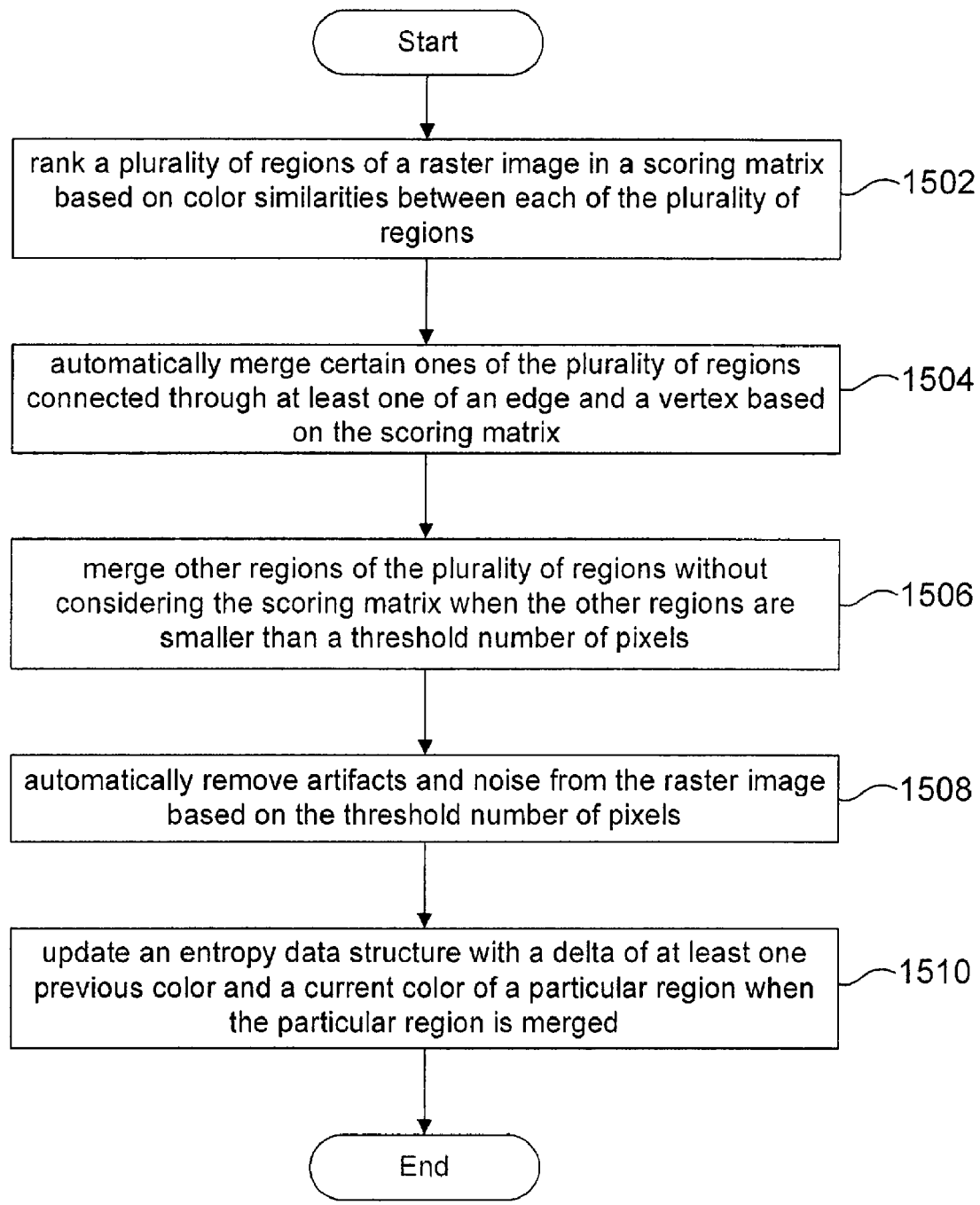
FIG. 15 is a process view of ranking and automatically merging at least certain regions of the raster image, according to an example embodiment.

FIG. 15 is a flow chart illustrating a method of ranking and automatically merging at least certain regions of a raster image (e.g., the raster image 1200), according to one embodiment. In operation 1502, a plurality of regions of a raster image (e.g., the raster image 120) may be ranked in a scoring matrix (e.g., the scoring matrix 1150 of FIG. 11B) based on color similarities between each of the plurality of regions. In operation 1504, certain ones of the plurality of regions may be automatically merged. Such regions may be connected through at least one edge and a vertex (e.g., eight-connected and/or four-connected) based on the scoring matrix (e.g., the scoring matrix 1150).

Next, in operation 1506, other regions may be merged without considering the scoring matrix when the other regions are smaller than a threshold number of pixels (e.g., as set by a user). In operation 1508, artifacts and noise may be automatically removed from the raster image (e.g., the raster image 1200) based on the threshold number of pixels. In operation 1510, an entropy data structure (e.g., the entropy data structure 137) may be updated with a delta of at least one previous color and a current color of a particular region when the particular region is merged.

Figure 16:
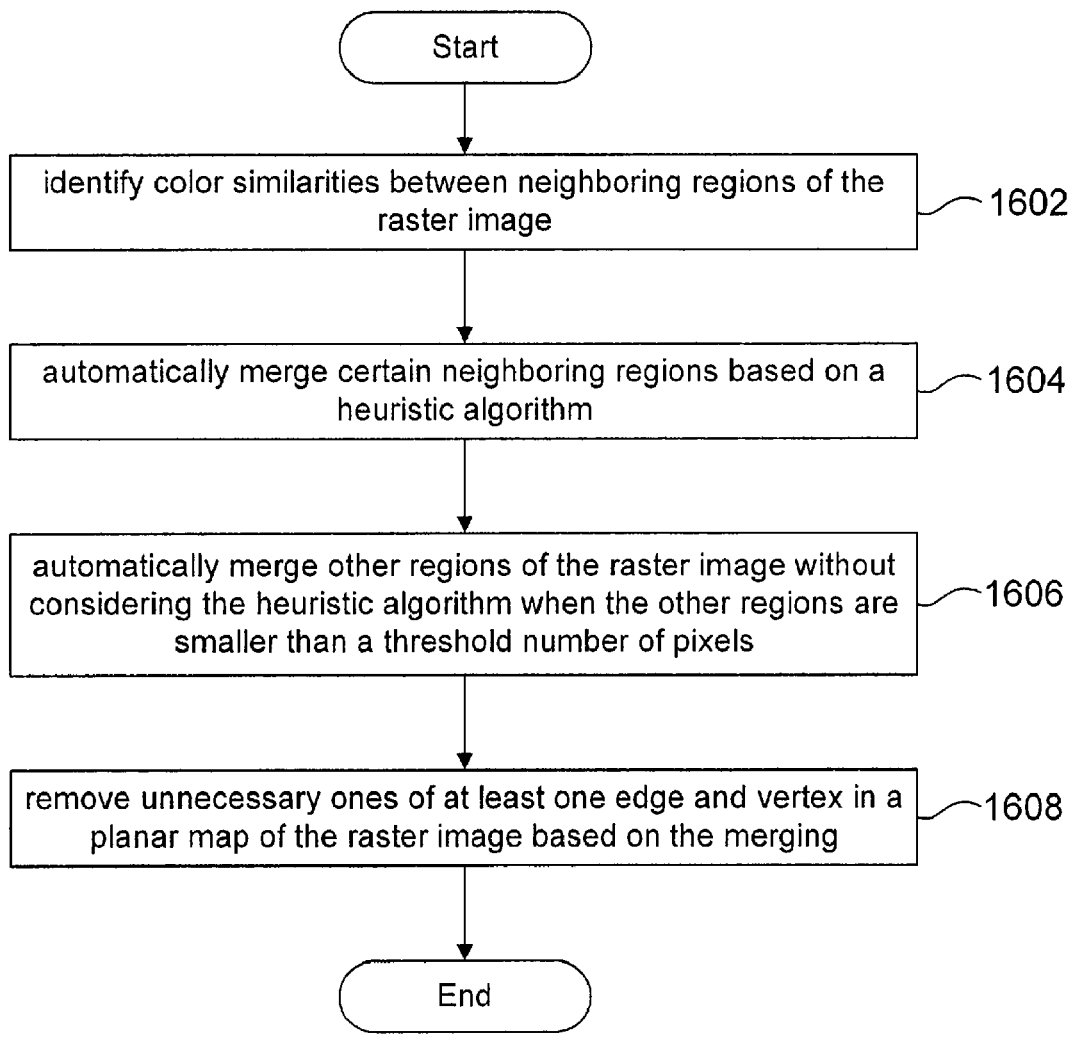
FIG. 16 is a process view of tracing the raster image through identification of color similarities and through a merge and removal process, according to an example embodiment.

FIG. 16 is a flow chart illustrating a method of tracing the raster image through identification of color similarities and through a merge and removal process, according to at least one embodiment. In one embodiment, the method illustrated in FIG. 16 creates a super-section (e.g., a number of regions merged together to form a super-section) of a portion (e.g., the portion may include a number of regions merged together) of the planar map 380 of the raster image 120. In operation 1602, color similarities may be identified between neighboring regions of the raster image (e.g., the raster image 120). In operation 1604, certain neighboring regions are automatically merged based on a heuristic algorithm (as previously described in FIG. 1 as being a problem-solving technique in which the most appropriate solution of several found by alternative methods is selected at successive stages of a program for use in the next step of the program).

In operation 1606, other regions of the raster image (e.g., the raster image 120) may be automatically merged without considering the heuristic algorithm when the other regions are smaller than a threshold number of pixels. In operation 1608, unnecessary edge(s) and/or one or more vertex may be removed in the planar map (e.g., the planar map 380) based on the merging (e.g., the merging may performed by the merge module 130, and the removal may be performed by the remove module 136 of FIG. 1).

While example embodiments are illustrated for tracing, other embodiments may be used for more abstract processing methods. For example, faces/regions of the planar map 380 may be filled with dots rather than be traced explicitly. Furthermore, other embodiments may be used to improve posterization. For example, operations disclosed herein may be applied to an input posterized image (16 colors) and pixels belonging to each region may be recolored to produce a new output image. In such an embodiment, the techniques are used as a pixel management and modification process rather than for tracing.

Although the present embodiments has been described with reference to specific example embodiments, it will be evident that various modifications and changes may be made to these embodiments without departing from the broader spirit and scope of the invention. For example, the various modules, analyzers, generators, etc. described herein may be performed and created using hardware circuitry (e.g., CMOS based logic circuitry), firmware, software and/or any combination of hardware, firmware, and/or software.

For example, the image analyzer 110, the tracing engine module 108, the effects module 106, the merge module 130, the remove module 136, the vertex generator module 114, the edge generator module 116, the region generator module 118, the planar map generator module 112, the crack dictionary synchronizer 124, and the auxiliary divider module 128 may be embodied using transistors, logic gates, and electrical circuits (e.g., application specific integrated ASIC circuitry) using an image analyzer circuit, a tracing engine circuit, an effects circuit, a merge circuit, a remove circuit, a vertex generator circuit, an edge generator circuit, a region generator circuit, a planar map generator circuit, a crack dictionary synchronizer circuit, and a auxiliary divider circuit. In addition, it will be appreciated that the various operations, processes, and methods disclosed herein may be embodied in a machine-readable medium and/or a machine accessible medium compatible with a data processing system (e.g., a computer system). Accordingly, the specification and drawings are to be regarded in an illustrative rather than a restrictive sense.

What is claimed is:

1. A method comprising:
   identifying a color similarity shared by first neighboring regions of among a plurality of regions of an image, the plurality of regions including the first neighboring regions and second neighboring regions;

merging the first neighboring regions based on the identifying of the color similarity and based on a heuristic algorithm, the merging of the first neighboring regions being performed by a processor of a machine; and merging the second neighboring regions of the plurality of regions of the image based on sizes of the second neighboring regions transgressing a threshold number of pixels.

2. The method of claim 1, wherein:
the merging of the second neighboring regions is based on the sizes of the second neighboring regions being smaller than the threshold number of pixels.

3. The method of claim 1, wherein:
the merging of the second neighboring regions is performed without use of the heuristic algorithm.

4. The method of claim 1 further comprising:
generating a planar map of the image, the plurality of regions of the image being sections of the planar map.

5. The method of claim 4, wherein:
the planar map includes a plurality of edges among the sections of the planar map; and the method further comprises
removing an edge from the planar map based on at least one of:
the merging of the first neighboring regions, or
the merging of the second neighboring regions.

6. The method of claim 4, wherein:
the planar map includes a plurality of vertices among the sections of the planar map; and the method further comprises
removing a vertex from the planar map based on at least one of:
the merging of the first neighboring regions, or
the merging of the second neighboring regions.

7. The method of claim 1, wherein:
the heuristic algorithm includes determining a merging order for the first neighboring regions based on the color similarities; and
the merging of the first neighboring regions is based on the merging order.

8. The method of claim 1, wherein:
the heuristic algorithm includes determining a weighted average color of at least some of the first neighboring regions.

9. The method of claim 8, wherein:
the heuristic algorithm includes determining the weighted average color based on sizes of at least some of the first neighboring regions.

10. The method of claim 1, wherein:
the identifying of the color similarity is based on a scoring matrix.

11. The method of claim 10, wherein:
the scoring matrix correlates a first region among the first neighboring regions with a second region among the first neighboring regions.

12. The method of claim 11, wherein:
the scoring matrix includes a score indicating a degree of similarity between the first and second regions among the first neighboring regions.

13. The method of claim 1, wherein:
the merging of the first neighboring regions includes updating an entropy data structure for the first neighboring regions.

14. The method of claim 13, wherein:
the entropy data structure indicates a previous color for a region among the first neighboring regions and indicates a current color for the region; and
the updating of the entropy data structure is based on a difference between the previous color and the current color exceeding a threshold value.

15. The method of claim 1, wherein:
the merging of the first neighboring regions is based on a direction vector associated with the first neighboring regions and indicating a merge direction.

16. The method of claim 1 further comprising:
generating a traced image based on the merging of the first neighboring regions.

17. The method of claim 1 further comprising:
generating a traced image based on the merging of the second neighboring regions of the plurality of regions of the image.

18. The method of claim 1 further comprising:
removing artifacts and noise from the image based on a further threshold number of pixels, the further threshold number of pixels being set by a user.

19. A non-transitory machine-readable storage medium comprising instructions that, when executed by one or more processors of a machine, cause the machine to perform operations comprising:
identifying a color similarity shared by first neighboring regions of among a plurality of regions of an image, the plurality of regions including the first neighboring regions and second neighboring regions;
merging the first neighboring regions based on the identifying of the color similarity and based on a heuristic algorithm; and
merging the second neighboring regions of the plurality of regions of the image based on sizes of the second neighboring regions transgressing a threshold number of pixels.

20. A system comprising:
means for accessing an image; and
a processor configured by a merge module, the merge module configuring the processor to perform operations comprising:
identifying a color similarity shared by first neighboring regions of among a plurality of regions of an image, the plurality of regions including the first neighboring regions and second neighboring regions;
merging the first neighboring regions based on the identifying of the color similarity and based on a heuristic algorithm; and
merging the second neighboring regions of the plurality of regions of the image based on sizes of the second neighboring regions transgressing a threshold number of pixels.

* * * * *